United States Patent Office 3,830,852
Patented Aug. 20, 1974

3,830,852
2-BENZYLPHENOLS
Jacques Debat, Paris, France, assignor to Institut De Recherches Chimiques Et Biologiques Appliquees I.R.C.E.B.A., Paris France
No Drawing. Filed Aug. 4, 1971, Ser. No. 169,113
Claims priority, application France, Aug. 18, 1970, 7030276
Int. Cl. C07c *39/12*
U.S. Cl. 260—619 R        3 Claims

ABSTRACT OF THE DISCLOSURE

The specification describes novel 2-benzylphenols of the formula:

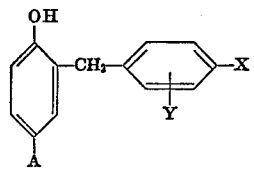

in which A is a neopentyl or 1,1,3,3 - tetramethylbutyl group, X is a hydrogen or halogen atom, and Y is a hydrogen atom or, when X is halogen, a halogen atom. These compounds have good bacteriostatic properties.

---

This invention is concerned with certain novel 2-benzylphenols, with a process for their preparation and with compositions containing them.

In U.S. Application Ser. No. 755,232, filed Aug. 26, 1968 and now abandoned in favor of U.S. application Ser. No. 267,073, filed June 28, 1972, we have described and claimed 2-(4'-halobenzyl)-phenols of the formula

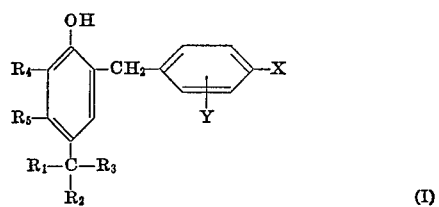

in which $R_1$ and $R_2$, which may be the same or different, are each an alkyl group containing from 1 to 5 carbon atoms; $R_3$ is hydrogen or an alkyl group containing from 1 to 5 carbon atoms, with the proviso that when $R_3$ is hydrogen, $R_1$ and $R_2$ may form, together with the carbon atom to which they are attached, a cycloalkyl group, particularly cyclohexyl; $R_4$ is hydrogen, halogen, a nitro group or a benzyl group, the latter, if desired, being substituted in the same manner as the benzyl group shown in the *ortho*-position of the phenolic ring; $R_5$ is hydrogen or a hydroxyl group; X is halogen, particularly chlorine or bromine; and Y is hydrogen or halogen, particularly chlorine or bromine. Tests showing the bacteriostatic activity of these compounds are also described in our said patent.

We have now surprisingly found that 2-benzylphenols of the formula:

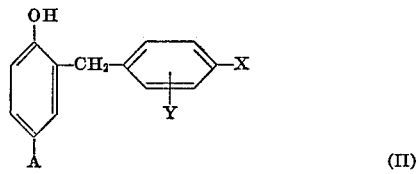

in which A is a neopentyl or 1,1,3,3 - tetramethylbutyl group, X is a hydrogen or halogen atom, and Y is a hydrogen atom or, when X is halogen, a halogen atom, that is compounds which differ from certain of those described in our said patent only in that they have a neopentyl or 1,1,3,3-tetramethylbutyl substituent in the 4-position of the phenolic ring, have an equal or better bacteriostatic activity than their homologues having an isopropyl or tert.-butyl substituent in the 4-position as described in our said patent.

The compounds of formula II are novel and constitute one aspect of the present invention. In these compounds, when X and/or Y is/are a halogen atom, it is preferably a chlorine, bromine or fluorine atom.

The 2-benzylphenols of formula II can be prepared by a process analogous to that described in our said patent, that is to say by condensing a substituted phenol of the formula:

in which A has the above-stated meaning, with up to an equimolar quantity of a benzyl chloride of the formula:

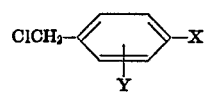

in which X and Y have the above-stated meanings. The reaction is preferably carried out in the presence of zinc chloride and an inert organic solvent, such as chloroform, at an elevated temperature, preferably the reflux temperature of the solvent used.

The present invention also comprises pharmaceutical compositions comprising at least one 2-benzylphenol of formula II and an inert, physiologically acceptable, carrier or excipient suitable for enteral, particularly oral, or external administration.

In order that the invention may be more fully understood, the following examples are given by way of illustration only:

EXAMPLE 1

2-(2,4-Dichlorobenzyl)-4-(1,1,3,3-tetramethylbutyl)-phenol

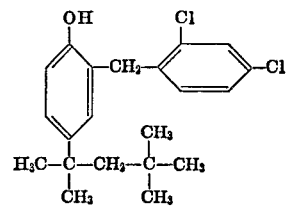

The following were introduced into a 1 litre flask provided with a reflux condenser:

206 g. (1 mole) of *p*-(1,1,3,3-tetramethylbutyl)-phenol,
147 g. (0.75 mole) of 2,4-dichlorobenzyl chloride,
27 g. (0.2 mole) of pure melted zinc chloride,
750 ml. of anhydrous chloroform.

The mixture was heated to reflux for 24 hours. The chloroformic reaction mixture was washed with water, and then dried over anhydrous sodium sulphate. The chloroform was evaporated off and the oil obtained was fractionally distilled under a pressure of 0.2 mm. Hg. The fraction distilling at 140/160° C., being the desired product indicated above, was collected and crystallised. Yield: 94 g. (32% of theory); m.p. 78° C. (after recrystallisation in petroleum ether).

EXAMPLES 2 TO 8

(a) Using the procedure described in Example 1, 4-neopentyl-phenol was reacted with benzyl chloride, 4-chlorobenzyl chloride, 2,4-dichlorobenzyl chloride, and 3,4-dichlorobenzyl chloride to give, respectively:

Example 2: 2-benzyl-4-neopentyl-phenol; m.p. 52° C.

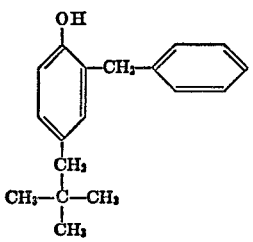

Example 3: 2-(4-chlorobenzyl)-4-neopentyl-phenol; m.p. 54° C.

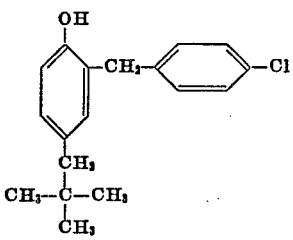

Example 4: 2-(2,4-dichlorobenzyl)-4-neopentyl-phenol, m.p. 42° C.

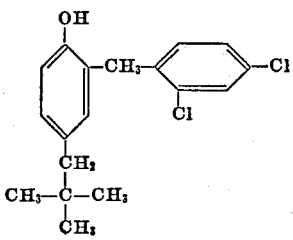

Example 5: 2-(3,4-dichlorobenzyl)-4-neopentyl-phenol; m.p. 48° C.

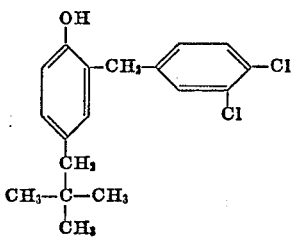

(b) Using the procedure described in Example 1, 4-(1,1,3,3-tetramethylbutyl)-phenol was reacted with benzyl chloride, 4-chlorobenzyl chloride, and 3,4-dichlorobenzyl chloride to give, respectively:

Example 6: 2-benzyl-4-(1,1,3,3-tetramethylbutyl)-phenol; refractive index $n_{20}=1.5445$

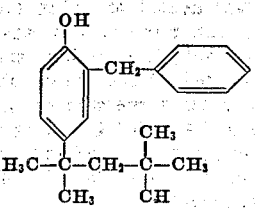

Example 7: 2-(4-chlorobenzyl)-4-(1,1,3,3-tetramethylbutyl)-phenol; m.p. 67° C.

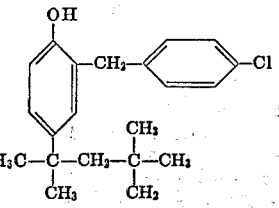

Example 8: 2-(3,4-dichlorobenzyl)-4-(1,1,3,3-tetramethylbutyl)-phenol; refractive index $n_{20}=1.539$.

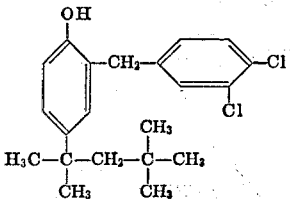

The compounds according to the invention have been submitted to toxicological and pharmacological tests.

The acute toxicity, per os, of the compound of Example 1 has been studied in rats according to the following experimental procedure. A group of 10 male rats weighing from 125 to 145 g. was used. 2-(2,4-Dichlorobenzyl)-4-(1,1,3,3-tetramethylbutyl)-phenol was suspended in olive oil and a uniform volume of 0.5 ml. of this suspension per 100 g. rat body weight was introduced into the stomach of each rat by means of an oesophagal catheter. The animals were given no food before the commencement of administration of the suspension. The temperature and behaviour of the animals were observed before the test and then 1½ hours to 3 hours after the ingestion. At the end of this time, the rats were returned to their cages and observed for several days.

There was no mortality or loss of weight at any of the four dosages tested. On completion of the observation period, the animals were sacrificed and their stomachs were opened and examined; no traces of ulceration were found. The $LD_{50}$ was found to be greater than 4 g./kg. The results obtained are given in Table I below.

TABLE I

| Dose, g./kg. | Mortality over 8 days in group of 10 rats | Observations |
| --- | --- | --- |
| 0.5 | 0 | |
| 1 | 0 | |
| 2 | 0 | A marbled kidney. |
| 4 | 0 | 5 rats slightly hypertrophied. |

The *in vitro* bacteriostatic activity of the compounds according to the invention was determined in comparison with that of known compounds, particularly homologues of the novel compounds. The activity was determined with respect to a particular Gram+strain of *Staphylococcus* London which was used as the reference strain for all the compounds.

The tests were carried out in a culture medium of the following composition:

Percent by weight
Bacteriological peptone free of indole _____ 40
Sodium chloride _____ 5
Glucose _____ 2
pH adjusted to 7–7.2.

Progressive dilutions of the compound under test were used. The dilutions went by steps of a thousandth from a concentration of 1 thousandth to ⅒ thousandth; by steps of a 10 thousandth from ⅒ thousandth to ¹⁄₁₀₀ thousandth; and by steps of a 100 thousandth from ¹⁄₁₀₀ thousandth to 1 millionth. If the compound under test was found to be active at a dilution of 1 millionth, a further series was made in steps of a millionth from a concentration of 1 millionth.

Two series of dilutions were made independently and the results obtained with the two series must be identical. Readings were taken at the end of 24 hours. The results obtained are given in Table II below.

TABLE II

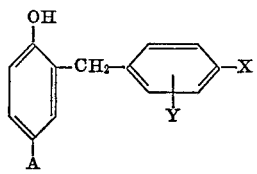

| Compound of Ex. No. | A | X | Y | Maximum dilution active against *Staphylococcus* London |
|---|---|---|---|---|
| 1 | 1,1,3,3-tetramethylbutyl | Cl | 2-Cl | 1/3,000,000 |
| 2 | Neopentyl | H | H | 1/700,000 |
| 3 | do | Cl | H | 1/600,000 |
| 4 | do | Cl | 2-Cl | 1/1,000,000 |
| 5 | do | Cl | 3-Cl | 1/2,000,000 |
| 6 | 1,1,3,3-tetramethylbutyl | H | H | 1/500,000 |
| 7 | do | Cl | H | 1/400,000 |
| 8 | do | Cl | 3-Cl | 1/600,000 |

Whilst the activity of formaldehyde and cresol against Gram+bacteria (expressed in terms of the maximum active dilution) is between 1/1000 and 1/10,000 according to the strain, the compounds according to the invention have an activity at least equal to 1/400,000.

It can be seen from Table II that the presence of 2 chlorine atoms in the phenyl ring of the 2-benzyl group enhances the anti-bacterial activity of the compounds, and that the activity of the unsubstituted 2-benzyl group is between that of the 2-(4-chlorobenzyl) group and that of the 2-dichlorobenzyl groups.

In particular the compounds of Examples 1 and 5 have an anti-bacterial activity which is substantially greater than that of the compounds of Examples 8 and 11 of our said patent (that is 2-(3,4-dichlorobenzyl)-4-sec.butyl-phenol and 2-(2,4-dichlorobenzyl)-4-isopropyl-phenol, respectively) which were stated in our said patent to be the most active of the compounds described therein (maximum dilution active against *Staphylococcus* London, 1/1,000,000).

The pharmaceutical compositions according to the invention suitably contain from 0.1 to 95% by weight of at least one of the compounds according to the invention.

For oral administration, the composition is preferably formulated as tablets or capsules, each tablet or capsule containing from 100 to 250 mg. of the active compound(s). For the treatment of injections due to Gram +bacteria, such tablets or capsules are suitably administered to human patients at the rate of 4 to 8 tablets or capsules per day, for at least 5 days and, preferably, for from 5 to 9 days. Good clinical results have been obtained with such a posology.

Any suitable carrier or excipient may be used in such tablets for oral administration such, for example, as starch, lactose, gum tragacanth, and methyl cellulose, and, if desired, sweetening agents.

It should be understood that while tablets and capsules are the preferred types of formulation of the compositions according to the invention, it is also possible to use formulations of other kinds, such as suspensions, syrups, suppositories and soft capsules.

What is claimed is:
1. 2-(2,4-Dichlorobenzyl) - 4 - (1,1,3,3-tetramethylbutyl)-phenol.
2. 2-(2,4-Dichlorobenzyl)-4-neopentyl-phenol.
3. 2-(3,4-Dichlorobenzyl)-4-neopentyl-phenol.

References Cited

UNITED STATES PATENTS

| 2,330,722 | 9/1943 | Lieber | 260—619 R X |
| 2,703,324 | 3/1955 | Binkley et al. | 260—619 R X |

OTHER REFERENCES

Buu-Hoi et al.: Jour. Org. Chem., vol. 20 (1955), 1129–1134.

McKay et al.: Jour. Med. Chem., vol. 6 (1963, 816–817.

BERNARD HELFIN, Primary Examiner

U.S. Cl. X.R.

424—246